United States Patent [19]
Abily et al.

[11] Patent Number: 5,983,307
[45] Date of Patent: Nov. 9, 1999

[54] ELECTRICAL CIRCUIT FOR EXCHANGING DATA BETWEEN A MICROPROCESSOR AND A MEMORY AND COMPUTER COMPRISING A CIRCUIT OF THIS TYPE

[75] Inventors: Jack Abily, Plaisir; Jean Yujun Qian, Cergy St-Christophe, both of France

[73] Assignee: Bull S.A., Louveciennes, France

[21] Appl. No.: 08/962,568

[22] Filed: Nov. 3, 1997

[30] Foreign Application Priority Data

Nov. 5, 1996 [FR] France .................................. 96 13464

[51] Int. Cl.[6] ........................................................ G06F 13/00
[52] U.S. Cl. ............................ 710/129; 710/35; 711/212; 711/132
[58] Field of Search ..................................... 395/309, 306, 395/308, 307, 855; 710/126, 127, 128, 129, 35; 711/119, 122, 132, 202, 212

[56] References Cited

U.S. PATENT DOCUMENTS 5,469,558  11/1995  Lieberman .
5,784,710  7/1998  Kaiser et al. ............................ 711/212
5,857,214  1/1999  Dey ......................................... 711/212

FOREIGN PATENT DOCUMENTS 0398178  11/1990  European Pat. Off. .
0437712  7/1991  European Pat. Off. .
0474450  3/1992  European Pat. Off. .

*Primary Examiner*—Glenn A. Auve
*Attorney, Agent, or Firm*—Kerkam, Stowell Kondracki & Clarke, P.C.

[57] ABSTRACT

In order to allow an external memory space to enter into the memory space of a microprocessor (43) comprising a cache memory (94), an integrated circuit (42) serves as an interface between the microprocessor (43) and a memory unit (8, 9, 12) constituting the external memory space. The integrated circuit (42) comprises a stack (91) sized for containing a data block from the memory unit (8, 9, 12) such that the block from the memory unit (8, 9, 12) is seen as one or more blocks in the cache memory (94), and a register (93) belonging to the memory space of the microprocessor (43) adapted to contain the coordinates for access to the memory unit (8, 9, 12).

11 Claims, 5 Drawing Sheets

ELECTRICAL CIRCUIT FOR EXCHANGING DATA BETWEEN A MICROPROCESSOR AND A MEMORY AND COMPUTER COMPRISING A CIRCUIT OF THIS TYPE

CROSS REFERENCE TO RELATED APPLICATIONS

The subject matter of the application is related to the following applications:

1) ABILY et al., Ser. No. 08/867,404, filed Jun. 2, 1997, entitled "Circuit for Moving Data Between Remote Memories and Computer Comprising Such A Circuit" and corresponding to French Application No. 96/07162.
2) ABILY et al., Ser. No. 08/867,410, filed Jun. 2, 1997, entitled "Circuit for Moving Data Between Remote Memories and Computer Comprising Such a Circuit" and corresponding to French Application No. 96/07163.
3) AUTECHAUD et al., Ser. No. 08/953,668, filed Oct. 17, 1997 (Docket 5771) entitled "Atomic Operations in Remote Storage and Device for Executing this Operation" and corresponding to French Application 96/12719.

The subject matter of application Ser. Nos. 08/867,404 and 08/867,410 is hereby incorporated by reference.

The applications noted above are assigned to the assignee of the subject application.

BACKGROUND OF THE INVENTION

1. Field of the Invention

The field of the invention is that of data exchanges between a microprocessor and one or more remote memories in data processing systems.

2. Description of Related Art

Generally, the function of a microprocessor is to execute the instructions of programs contained in its memory space. This memory space is embodied by a local memory and possibly by various input-output registers. These instructions and the data required for their execution are accessible by the microprocessor using the addressing means of its memory space. However, considering the relatively long times required to access its entire address space, the microprocessor is usually equipped with a cache memory which is much faster, but whose content is limited to a certain number of extracts from the contents of the local memory and possibly from the various input-output registers. The cache memory is adapted to the address space of the microprocessor. Further details on the operation of cache memories may be found by referring to the following U.S. patents filed in the name of the "Assignee of the present invention", which describe devices for access to a memory by a processor:

U.S. Pat. No. 5,218,687
U.S. Pat. No. 5,295,253
U.S. Pat. No. 5,408,623
U.S. Pat. No. 5,537,621

The execution by the microprocessor of the instructions of programs contained in a memory space external to its own memory space raises the problem of the incompatibility of its cache memory to this external memory space. It is possible to provide, in a circuit for interfacing with the microprocessor, input-output registers inside the memory space of the microprocessor, in communication with the physical elements of the external memory space so as to provide direct access to the instructions and to the data required for their execution contained in these physical elements. However, if the physical elements of the external memory space are remote storage units, the latency in the exchanges runs the risk of considerably diminishing the performance of the microprocessor in its execution of programs.

SUMMARY OF THE INVENTION

The invention eliminates these drawbacks by making it possible for the external memory space to be entered into the memory space of the microprocessor.

A first subject of the invention is an electrical circuit comprising:
 a microprocessor for exchanging data with a storage unit external to the memory space of the microprocessor, which microprocessor comprises a cache memory,
 an integrated circuit to serve as an interface between the microprocessor and the external storage unit, characterized in that the integrated circuit comprises:
 a stack designed to contain a data block of the external storage unit, such that the block of the external storage unit is seen as one or more blocks in the cache memory,
 a register belonging to the memory space of the microprocessor, intended to contain the coordinates for access to the blocks of the external storage unit.

An additional problem arises if the width of the data path in the external memory space is different from the width of the data path in the memory space of the microprocessor. In this case the dimensions of the data blocks in the external memory space may not correspond to the dimensions of the data blocks in the cache memory.

A second subject of the invention is an electrical circuit similar to its first subject, characterized in that the addressing of the stack in the memory space of the microprocessor simultaneously codes a physical address of a block in the stack and a mode for reading or writing this block.

BRIEF DESCRIPTION OF THE DRAWINGS

The invention will be better understood with the aid of the following description in reference to the figures.

DESCRIPTION OF THE PREFERRED EMBODIMENTS

Figure 1:
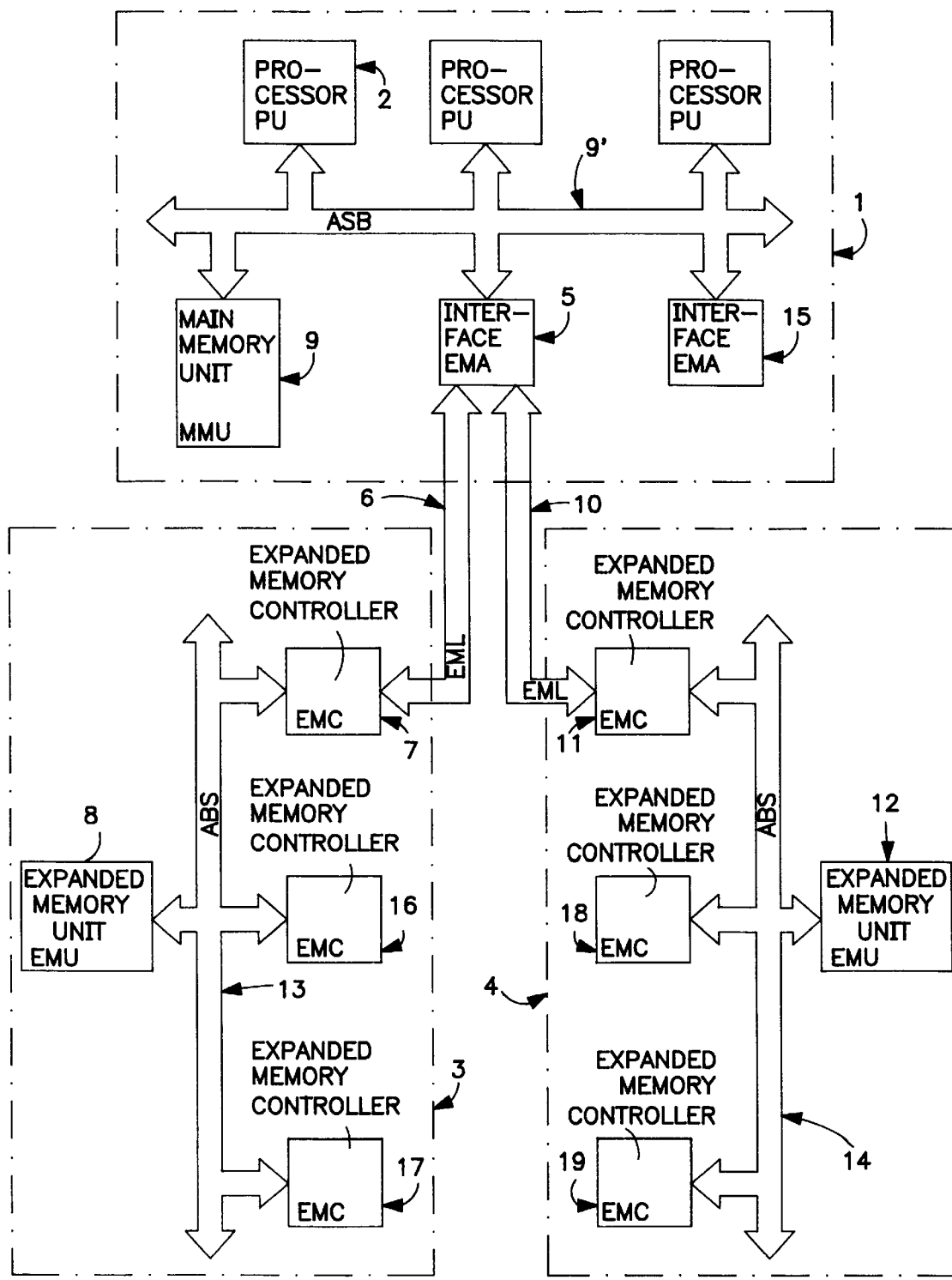
FIG. 1 represents a data processing system with a computer having access to at least one expanded storage unit according to the invention.

In FIG. 1, a computer 1 comprises a main storage or memory unit MMU 9 accessed by at least one processor PU 2 by means of a system bus ASB 9'. Connected to the bus ASB 9' are one or more expanded storage access interfaces EMA. The interface EMA 5 is connected to an expanded storage or memory controller EMC 7 located in a cabinet 3 remote from the computer 1, by means of a link EML 6. A link EML can be a serial link or a parallel link which allows a high speed transfer of information. The cabinet 3 comprises an expanded storage or memory unit EMU 8 accessed by the expanded memory controller 7 by means of a system bus ASB 13. Other controllers EMC 16, 17, whose quantity represented in the figure is not limitative, can also be provided for accessing the expanded memory unit EMU 8 by means of the system bus 13. The controller 16 makes it possible, for example, to exchange data with another computer, not represented, according to the same diagram as for the computer 1. It is possible to provide for the interface 5 to also be connected to an expanded storage or memory controller EMC 11 located in a cabinet 4 by means of a link EML 10. Like the cabinet 3, cabinet 4 comprises an expanded storage or memory unit EMU 12 accessed by the expanded memory controller 11 by means of a system bus ASB 14. Other controllers EMC 18, 19, whose quantity represented in the figure is not limitative, can also be provided for accessing the expanded memory unit EMU 12 by means of the system bus 14. The controller 18 makes it possible, for example, to exchange data with another computer, not represented, according to the same diagram as for the computer 1. The expanded memory unit 12 makes it possible to back-up or increase the capacity of the expanded memory unit 8. Used as a backup, the expanded memory unit EMU 12 allows redundancy of the data stored. Used to increase capacity, the expanded memory unit 12 makes more expanded storage available.

The computer 1 in FIG. 1 has a second interface EMA 15, also connected to the system bus 9'. By connecting a first port of the interface EMA 15 to a second port of the controller EMC 16 and a second port of the interface 15 to a second port of the controller EMC 18, by means of links EML not represented for the sake of clarity in the figure, it is possible to obtain a redundancy of the connections of the computer 1 with the cabinets 3 and 4.

The expanded memory units EMU 8 and 12 are each subdivided into $2^j$ pages whose addresses are coded in j bits. Each page is in turn subdivided into $2^k$ data blocks whose addresses are coded in k bits. The width of the data path from the interface EMA 5 to the controller EMC 7 through the link EML 6 is $2^m$ bytes. A byte is, for example, an octet or a nonet. Thus $2^m$ bytes constitute a sub-block of a data block. Each data block contains $2^n$ sub-blocks, addressable in n bits in a block. Thus, the memory space of the expanded memory units EMU is addressable in j+k+n bits for each sub-block. The same is true for the memory space of the main memory unit, possibly with different values of j and k.

In the computer 1, a data move between the main memory unit MMU 9 and the expanded memory unit EMU 8 or the expanded memory unit EMU 12 is executed at the request of a processor PU of the computer 1. A processor PU of the computer 1 can also request a direct move between the expanded memory unit EMU 8 and the expanded memory unit EMU 12. For this purpose, the processor PU, by order of a process in progress in the processor PU, sends a move request to the interface EMA 5, indicating to it the source memory unit from which the data will be extracted in blocks, and the target storage unit into which the data will be input in blocks. If the source memory unit is the main memory unit MMU 9, the target memory unit is the expanded memory unit EMU 8 or the expanded memory unit EMU 12. If the source memory unit is the expanded memory unit EMU 8 or 12, respectively, the target memory unit is the main memory unit MMU 9 or the expanded memory unit EMU 12 or 8, respectively. The process that originated the move also indicates in its request the address of the first sub-block in the source memory, the address of the first sub-block in the target memory at which the move begins, and the quantity of sub-blocks to be moved. From then on, the interface EMA 5 executes the move independently from the processor PU.

A process can request a synchronous move or an asynchronous move. In the case of a synchronous move, the process is interrupted and does not resume until the move has finished. Therefore, a synchronous move needs to be rapid. In the case of an asynchronous move, the process proceeds without waiting for the end of the move, which is executed independently. In order not to penalize a process requesting a synchronous move while an asynchronous move in progress, a synchronous move request can interrupt an asynchronous move in progress in the interface EMA, which will resume at the end of the synchronous move. The interface EMA manages the interruptions and resumptions of moves in a way that is transparent for the processes executed by the processor PU.

Figure 2:
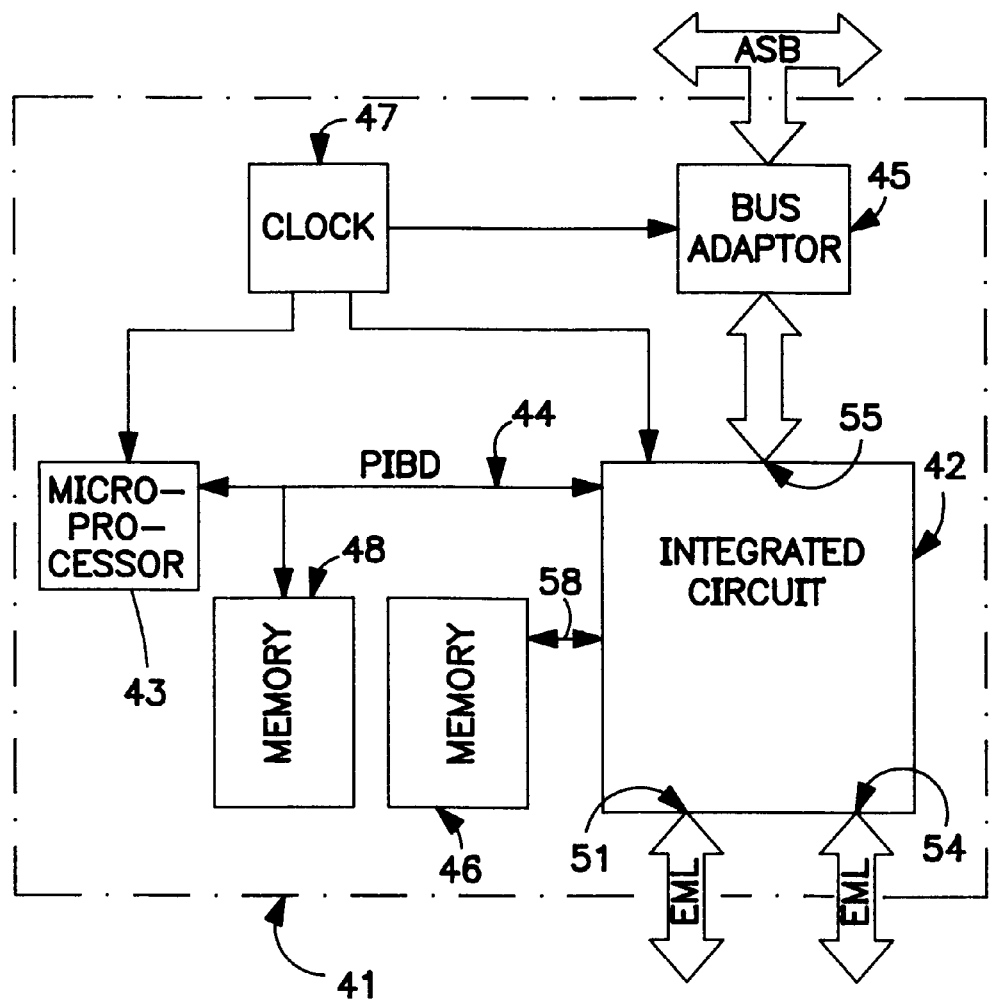
FIG. 2 represents one possible embodiment of the circuit of the invention in the system of FIG. 1.

An interface EMA or a or memory controller EMC is embodied by a circuit 41, shown in greater detail in FIG. 2. The circuit 41 essentially comprises an integrated circuit MEP 42, described in detail in reference to FIG. 3, synchronized by a clock generator ARG 47 and controlled by a microprocessor 43. A permanent memory FPROM 46 contains microcode for operating the integrated circuit 42. A random access memory SRAM 48 is provided for containing the data which qualify the moves processed by the circuit 41. At the initialization of the circuit 41, the integrated circuit 42 loads into the memory 48 the microcode contained in the memory 46. In order to do this, the circuit 42 directly accesses the memory 46 by means of a link 58. The memory 46 essentially guarantees the permanence of the information at initialization while the memory 48 guarantees the access performance during operation. If the read-write standards in the memories 46 and 48 are different, for example in one byte in the memory 46 and in eight bytes in the memory 48, the integrated circuit 42 performs the necessary regrouping of bytes and generates the appropriate parity checks. A bus adaptor circuit IOBA 45 makes it possible to adapt the circuit 41 to the system bus ASB for the transfer of data between the bus ASB and the integrated circuit 42. The circuit 45 and the microprocessor 43 are synchronized by the clock generator 47. The microprocessor 43 exchanges and processes the data from the memory 48 and the circuit 42 by means of a bus PIBD 44 and the microcode contained in the memory 48. The circuit 42 comprises an input-output port 55 connected to the adaptor circuit 45 and two input-output ports 51 and 54 connected by a link EML to a remote circuit identical to the circuit 41. A circuit 41 operating in EMA is connected to a circuit 41 operating in EMC. The width of the data path is identical in the ports 51, 54, and 55 and is equal to $2^m$ bytes. The advantage of the adaptor 45 is that it can support an addressability different from a standard addressability in the ports 51, 54 and 55. For example, the addressing of the ports 51, 54 and 55 can be done in 40 bits, while the addressing of the main storage unit MMU can be done in 32 bits.

Figure 3:
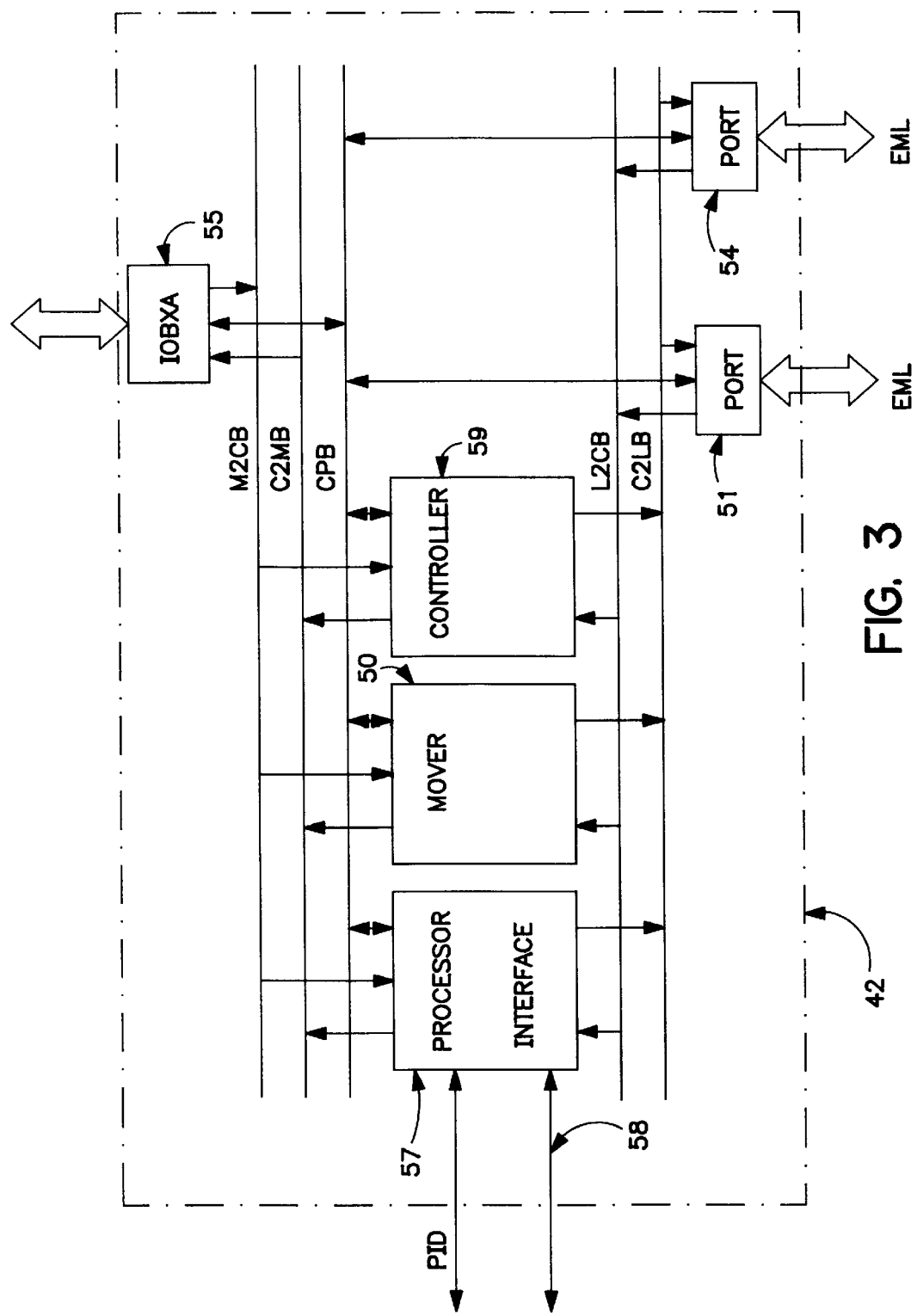
FIG. 3 represents a first level of refinement of the architecture of a circuit for implementing the invention.

FIG. 3 shows the architecture of the integrated circuit 42. A processor interface component CP 57 allows the exchange of data for qualifying a move with the processor 43 by means of the bus PIBD. The processor interface component 57 is directly connected to the memory 46 by the link 58 for the purpose of loading, at initialization in the memory 48, the microcode contained permanently in the memory 46. A mover component CM 50 is activated by the processor interface component 57 in the case where the integrated circuit 42 is mounted in a circuit 41 which takes the place of an interface EMA. A controller component CS 59 is activated by the processor interface component 57 in the case where the integrated circuit 42 is mounted in a circuit 41 which takes the place of a controller EMC.

The data exchanged with an external memory unit located in the same cabinet as that in which the circuit 41 is installed pass through the port 55. If the circuit 41 is installed in the computer 1, the external memory unit is the main memory unit MMU, and if the circuit 41 is installed in a cabinet 3 or 4, the external memory unit is the expanded memory unit EMU. A bus M2CB transfers the data from the port 55 to the processor interface component 57, to the mover component CM 50 or to the controller component CS 59. A bus C2MB transfers the data from the processor interface component 57, from the mover component CM 50 or from the controller component CS 59 to the port 55. The data exchanged with remote external storage pass through the ports 51 and 54. If the circuit 41 is installed in the computer 1, the remote external storage unit is the expanded storage unit EMU of a cabinet 3 or 4; if the circuit 41 is installed in a cabinet 3 or 4, the remote external storage unit is the main storage unit MMU of a computer. A bus L2CB transfers the data from the port 51, 54 to the processor interface component 57, to the mover component CM 50 or to the controller component CS 59. A bus C2LB transfers the data from the processor interface component 57, from the mover component CM 50 or from the controller component CS 59 to the port 51, 54. A bidirectional bus CPB allows the processor interface component 57 to exchange data with the ports 51, 54, 55, with the mover component 50 or with the controller component 59.

The port 51 and the ports 54, 55 can have one or more inputs in the bus C2MB and the bus C2LB, respectively, as well as one or more outputs in the bus M2CB and the bus L2CB, respectively. For example, the presence of two inputs and two outputs of a port makes it possible to double the transmission band of the exchanges with the remote memories.

The microprocessor 43 executes a microcode previously loaded into the memory 48 as a function of data contained in the memory 48 and data exchanged with the processor interface component 57.

Figure 4:
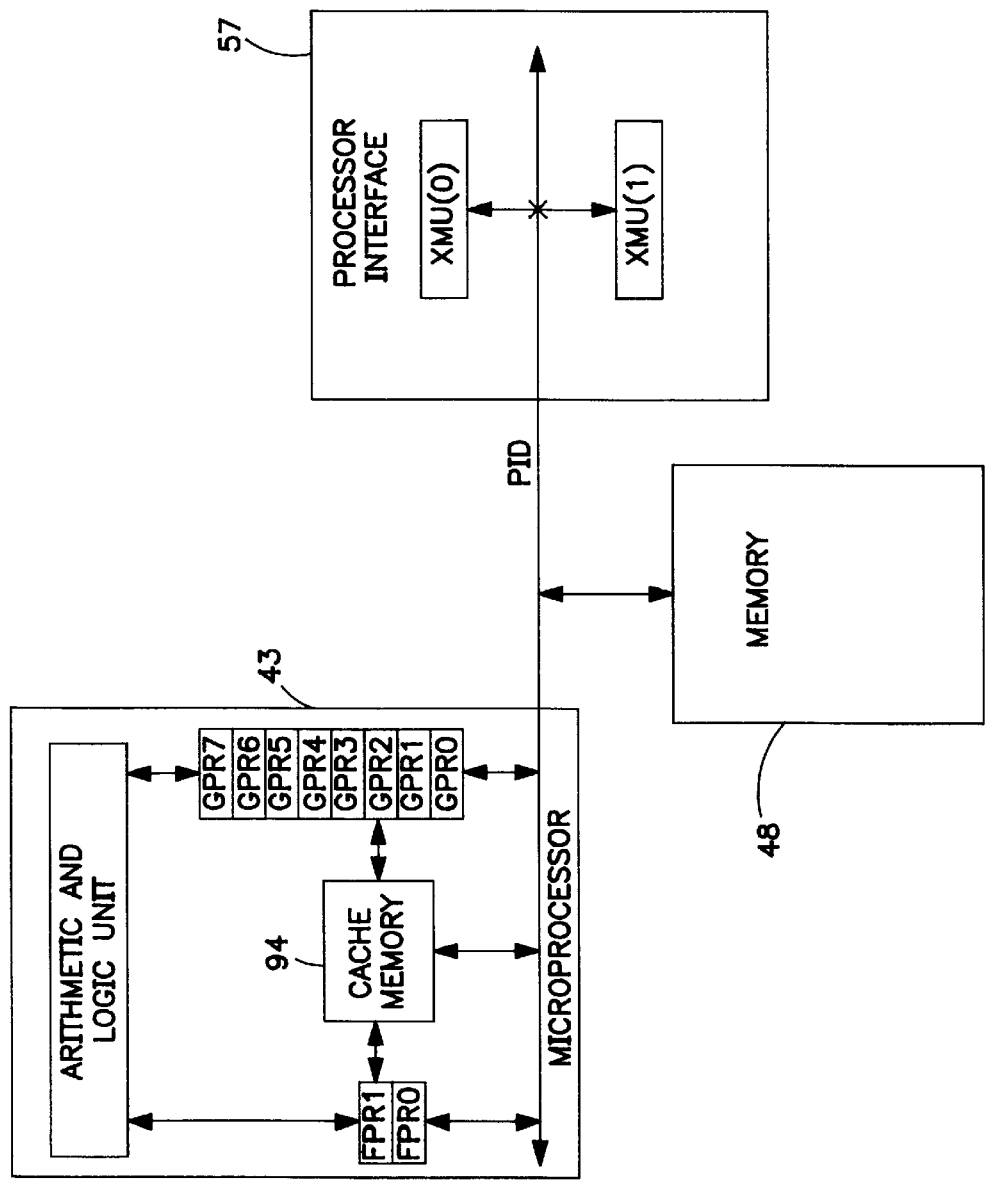
FIG. 4 shows the access by a microprocessor to a port of the circuit according to the invention.

As seen in FIG. 4, the microprocessor 43 comprises an arithmetic and logic unit UAL which processes the contents of registers such as the registers GPR0 through GPR7 for general processing and the registers FPR0, FPR1 for floating-point processing. The data stored in the registers GPR0 through GPR7, FPR0 and FPR1 are loaded from a cache memory 94 or directly from the bus PID whose source is the memory 48, or from the processor interface component 57. The data stored in the registers GPR0 through GPR7, FPR0 and FPR1 directly from the bus PID, are loaded in non-burst mode, that is, register value by register value. The data stored in the cache memory 94 are loaded in burst mode from the bus PID whose source is the memory 48, or from the processor interface component 57, so as to present in the microprocessor 54 an image of the data contained in the memory 48 or in registers of the processor interface component 57 such as ports XMU0 or XMU1. The data image presented in the cache memory 94 allows rapid processing of these data in the microprocessor 43. The microprocessor 43 and the processor interface component 57 may have other registers that are not essential to the understanding of the particular embodiment of the invention described herein.

Figure 5:
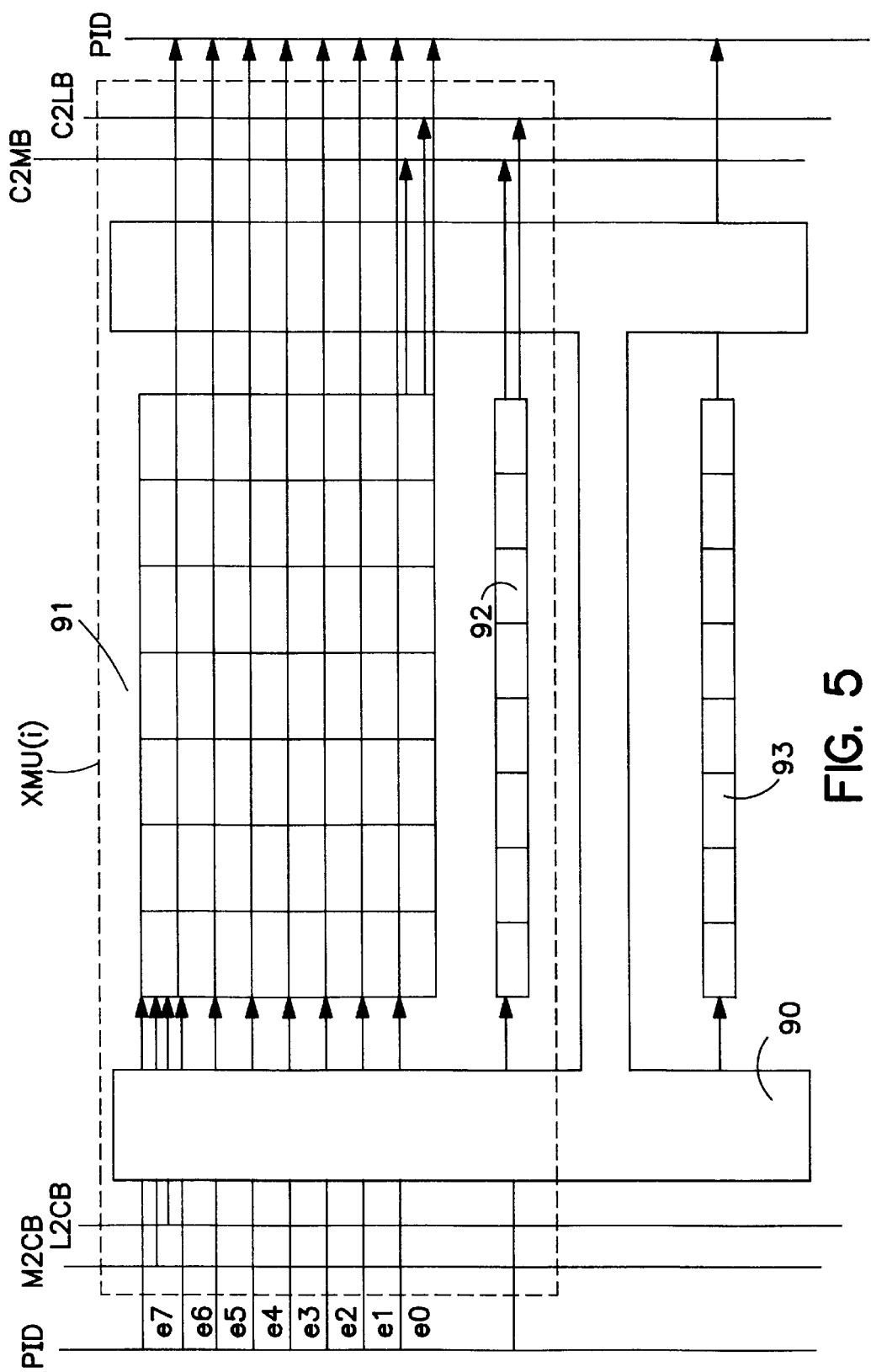
FIG. 5 represents the layout of a port of the circuit according to the invention.

FIG. 5 shows the physical resources of the processor interface component necessary to the invention. These resources are embodied by means of registers, toggles or a random access memory.

The processor interface component 57 comprises p identical ports XMU{i} which vary from 0 to p−1. Each port XMU{i} allows the microprocessor 43 to read access and write access external memories such as the main storage unit MMU and the expanded storage units EMU. If for example p equals 2, two ports XMU0 and XMU1 make it possible to double the data flow between the microprocessor 43 and the external memories, and thus to increase the transmission band of the exchanges. Two ports XMU0 and XMU1 also allow simultaneity in the execution of tasks with different priority levels so that, for example, assigning the port XMU0 to application-level tasks and the port XMU1 to interruptions ensures that the transmissions linked to the application-level tasks will not be disturbed by the transmissions linked to the interruptions. The processor interface component 57 also comprises at least one status register 93, such as a register which will henceforth be called revstat, and a hardwired logical block 90 for generating read- and write-accesses of the port XMU{i} and of other registers of the processor interface component 57 through the busses PID, M2CB, L2CB, C2LB and C2MB. The register revstat and the hardwired logical block 90 may be common to several ports XMU{i}. Each port XMU{i} comprises a stack 91 of the first-in-first-out type, henceforth called x2y{i}d and a register 92, henceforth called c2y{i}h.

The stack 91 is intended, on the one hand, to receive data from the main memory unit MMU through the bus M2CB, from an expanded memory unit EMU through the bus L2CB and from the microprocessor 43 through the bus PID, and on the other hand, to send data to the main memory unit MMU through the bus C2MB, to an expanded memory unit EMU through the bus C2LB, and to the microprocessor 43 through the bus PID. The stack 91 is designed to contain an entire data block from remote storage. FIG. 5 represents the case where the data block is composed in the remote memories of 64 9-bit bytes, which corresponds to the width of the data path in the busses M2CB, L2CB, C2LB and C2MB. The stack 91 in this case has 8 inputs $e_q$, q varying from 0 to 7, each of which accesses 8 9-bit cells, thus bringing the stack 91 to a size of 64 9-bit cells. The stack 91 is seen by the microcode as being constituted by 4 slices, each of which groups 16 cells with two consecutive inputs. The read- or write-access of the stack 91 by microcode takes place by means of virtual registers whose addresses in the bus PID are divided into two parts. A first bit stream of the address, identical for all the virtual registers, directly encodes the physical address of an input of the stack 91. A second bit stream of the address, identical for all the virtual registers but with different values so as to distinguish each virtual register, encodes the result of the read- or write-access of the stack 91.

For example, virtual registers rwxmu9d{i}_{u} of eight eight-bit bytes are physically addressed in the stack 91 x2y{i}d. The first 36 bits of an input $e_q$ of the stack x2y{i}d are read- and write-accessible through the bus PID in the register rwxmu9d{i}_{u}, where {u} is replaced by the value q/2. The last 36 bits of the input $e_q$ of the stack x2y{i}d are read- and write-accessible through the bus PID in the register rwxmu9d{i}_{u}, where {u} is replaced by the value q/2+1. During a read- or write-access of a register rwxmu9d{i}_q/2 or rwxmu9d{i}_q/2+1, the hardwired logic of the processor component interface 57 decodes the first bit stream of the address in order to transfer the input $e_q$ to the bus PID and decodes the second bit stream of the address so as to obtain the next result. The first 28 bits of a register rwxmu9d{i}_q/2 have null values and the next 36 bits have the values of the first 36 bits of the input $e_q$. The first 28 bits of a register rwxmu9d{i}_q/2+1 have null values and the next 36 bits have the values of the last 36 bits of the input $e_q$. Thus, it is possible to see that the 72 bits of an input $e_q$ are read- or write-accessible through the bus PID by means of two virtual registers rwxmu9d{i}_q/2 and rwxmu9d{i}_q/2+1 of 64 bits each. For a data path width imposed by the bus PID, for example 64 bits, it is possible to read and write byte sets, each of which sets has a number of bits, for example 72, incompatible a priori. The reading or writing of all 72 bits of an input $e_q$ using two 64-bit words produces a conversion of bytes between two different formats, for example nine and eight bits, without any loss of information. The read- and write-access to the registers rwxmu9d{i}_{u} by the microprocessor 43 occurs in burst mode, which means that the image of a register rwxmu9d{i}_{u} is present in the cache memory of the microprocessor 43, and the access to the register rwxmu9d{i}_{u} occurs by means of its image in the cache memory; if the image of the register rwxmu9d{i}_{u} is missing from the cache memory, an image of all the registers rwxmu9d{i}_{u} for a given value of {i} and for all the values of {u} is transferred into the cache memory of the microprocessor 43.

In another example, virtual registers rwxmu8d{i}_{u} of eight eight-bit bytes are physically addressed in the stack 91 x2y{i}d. Of the 72 bits of an input $e_q$ of the stack x2y{i}d, 64 bits are read- and write-accessible through the bus PID in the During a read- or write-access of a register rwxmu8d{i}_q, the hardwired logic of the processor interface component 57 decodes the first bit stream of the address in order to transfer the input $e_q$ to the bus PID and decodes the second bit stream of the address to obtain the next result. The eight bits of the $r^{th}$ byte, r varying from 0 to 7, of the register rwxmu8d{i}_q have the values of the last eight bits of the $r^{th}$ byte of the input $e_q$. During a read-access of the stack x2y{i}d, it may be seen that the information in the first bit of each nine-bit byte is lost for the microprocessor 43. However, this is not important if the first bit of a nine-bit byte does not contain any information required by the microprocessor 43. During a write-access of the stack x2y{i}d, the hardwired logic of the processor interface component 57 places a null value in the first bit of each nine-bit byte. For a data path width imposed by the bus PID, for example 64 bits, it is possible to read and write sets of bytes, each of which sets has a number of bits, for example 72, incompatible a priori. In this case there is, strictly speaking, no conversion of information between two different formats, for example nine and eight bits. The read- and write-access to the registers rwxmu8d{i}_{u} by the microprocessor 43 occurs in burst mode, which means that if the image of a register rwxmu8d{i}_{u} is present in the cache memory of the microprocessor 43, the access to the register rwxmu8d{i}_{u} takes place by means of its image in the cache memory; if the image of the register rwxmu8d{i}_{u} is missing from the cache memory, an image of all the registers rwxmu8d{i}_{u}, for a given value of {i} and for all the values of {u}, is transferred into the cache memory of the microprocessor 43.

The register 92 is intended to send message headers to the bus C2LB so as to send read or write requests to an expanded memory unit EMU, or to the bus C2MB so as to send read or write requests to the main memory unit MMU. The register 92 is sized to contain an address and a remote memory data block length, and whether the message transmitted is a read request or a write request. In the example in FIG. 5, the register 92 is composed of eight eight-bit bytes. The write access to the register by microcode takes place by means of virtual registers whose addresses in the bus PID are divided into two parts. A first bit stream of the address, identical for all the virtual registers, directly encodes the physical address of the register 92. A second bit stream of the address, identical for all the virtual registers but with different values so as to distinguish each virtual register, encodes the result of the write access of the register 92.

For example, virtual registers w[me]muh{i}_{u} of eight eight-bit bytes are physically addressed in the register 92 c2y{i}h. A register w[me]muh{i}_{u} is write-accessible by means of direct (non-burst) access by the microprocessor 43 through the bus PID. The value of [me] indicates an external storage unit accessed, for example mm for the main memory unit MMU or em for the expanded memory unit EMU. The value of {i} indicates the stack x2y{i}d with which this register is associated, and the value of {u} indicates an input of the port IOBXA or one of the inputs of the ports SLC with which this register associated. When the microcode write-accesses the register w[me]muh{i}_{u}, the hardwired logical block 90 loads the data written into the header register c2y{i}h using the first bit string of the address without modifying these data.

Using the second bit string of the address which codes the values of [me] and {u}, the hardwired logical block 90 sends the eight bytes of the register c2y{i}h, adding a null header bit to each byte, to the bus C2MB if the second bit stream of the address codes a value of [me] equal to mm and to the bus C2LB if the second bit stream of the address codes a value of [me] equal to em. In the bus C2MB, these bytes are addressed to the input {u} of the port IOBXA coded by the second bit stream of the address of the register w[me]muh{i}_{u}. In the bus C2LB, these bytes are addressed to the input {u} of a port SLC code second bit stream of the address of the register w[me]muh{i}_{u}. If the content of the register w[me]muh{i}_{u} indicates a write request header, the hardwired logical block 90 sends, after the contents of the register w[me]muh{i}_{u}, the contents of the stack x2y{i}d to the same bus C2MB or C2LB. Thus, a write operation in a register w[me]muh{i}_{u} initializes an access to the memory unit connected to the port associated with this register. The hardwired logical block 90 puts the bytes contained in the header into the format of the memory unit accessed, if need be adding the necessary number of zeros ahead of the bytes received from the microprocessor 43.

The register revstat is read-accessible via direct access by the microprocessor 43. There are several possible addresses for the reading through the bus PID of the register revstat by the microprocessor 43. All of these addresses have in common, for example, a certain number of high-order bits with identical values which physically address the register revstat, and bits, for example low-order bits, with different values for reading the register revstat in different modes, the register revstat in this case being seen as a number of virtual registers such as revstat, revstati, revstatm0, revstatm1, etc. The register revstat is a status register of the processor interface component CP and contains, among other things, bits named "it" for coding the sources of various interruptions, status bits of ports XMU{i} such as those named rpr{i} for indicating that the data stack x2y{i}d has received data from a bus L2CB or M2CB. Readings of the register revstat are distinguished by the fact that when the register is named revstat, a read operation leaves its bits as is, when it is named revstati, a read operation resets the bits "it" to zero, when it is named revstatm0, a read operation resets the status bits of the port XMU0 to zero, when it is named revstatm1, a read operation resets the status bits of the port XMU1 to zero, and so on. This makes it possible to detect, at each read operation, the new events that have occurred since the previous read operation.

Appendix 1 presents a simplified example of a sequence which allows the microprocessor to read a block of sixteen bytes in the main storage unit MMU with a conversion of the data format. This read operation uses, as resources in the integrated circuit MEP 42, the registers x2y0h and x2y0d of the processor interface component 57. In the integrated circuit MEP 42, these registers are connected to the main storage unit MMU by means of the bus CPB and the port 55.

The first two lines of the sequence transmit by microcode to the integrated circuit MEP the header of a request to read in a source memory, which in the example in which the source memory is the main storage unit MMU, will be transmitted to it through the port 55. In line 1, an instruction CFD (Load Floating Point Double) loads, as a double-precision floating point value, the is address of the source memory coded in the bits labelled s and an address in the source memory coded in the bits labelled a, into the double-precision floating point register FPR0 of the microprocessor 43. For example, the bits labelled s set at zero indicate that the source memory is the main storage unit MMU. In line 2, an instruction RFD stores, as a double-precision floating point value (Store Floating Point Double), the contents of the register FPR0 in the register wmmuh0__1 of the processor interface component 57. Since the register wmmuh0__1 is in direct write access, the storage is implemented directly in the physical register c2y0h without passing through the cache memory of the microprocessor 43. At the write operation in the register c2y0h, the hardwired logical block 90 sends a read request header of the address aaaaaaaaa to the first input of the port 55. The instructions in the double-precision floating-point registers allow optimum utilization of the width of the data path in the bus PID in non-burst mode, a width of eight octets, for example.

Lines 4 through 9 test by microcode whether the read response from the main memory unit MMU has been received by the integrated circuit MEP 42. Line 4 is simply a label to which lines 5 through 8 loop back until the arrival of data in the port XMU0 is detected in line 9. In line 5, the instruction CFD loads, as a double-precision floating-point value, the contents of the register revstatm0 into the double-precision floating-point register FPR0 of the microprocessor 43. The loading of the register revstatm0 causes the transfer of the contents of the register 93 into the register FPR0 immediately, without passing through the cache memory of the microprocessor 43, since the register revstatm0 is in direct read access. The name given to the register 93 then triggers the resetting of the bit rpr0 by the hardwired logical block 90. In line 6, the instruction RFD stores the contents of the register FPR0 as given by the cache memory of the processor 43. In line 7, the instruction CMC loads these data from the cache memory into the general-purpose register GPR0 for executing on them operations other than purely arithmetical ones, such as for example a test. Lines 8 and 9 perform a test on the value of the bit rpr0 in such a way as to repeat the instructions of lines 4 through 7 until the bit rpr0 is at 1. When the bit rpr0 is at 1, it indicates that the read response has been received in the stack x2y0d, the microcode then loops so as to scan the contents of the register 93 until the read response is received in the stack x2y0d, at which point the reading of the stack x2y0d implemented by lines 11 through 20 is triggered.

Line 11 is simply a label for the branching of a positive test performed by lines 4 through 9. In line 12, an instruction VLC eliminates from the cache memory (Data Cache Block Flush), the possible presence of the block of eight 32-bit words, beginning with the first word of the register rwxmu9d0. This ensures that no invalid values of the registers rwxmu9d0 through rwxmu9d0__3 will be read in the cache memory. Beginning with line 13, the loading of the register rwxmu9d0 into the register GPR0 refreshes the contents of the cache memory in burst mode, using an instruction CMC (Load Word & Zero), with the contents of the registers rwxmu9d0 through rwxmu9d0__3. The side effects are such that the contents of the register GPR0 contain the first word, that is, the first four octets of the register rwxmu9d0, and only the last four bits of this first word are representative of a content of the stack x2y0d. Next, the presence in the cache memory of the microprocessor 43 of the eight words contained in the registers rwxmu9d0 through rwxmu9d0__4 accelerates their processing by the microcode. In line 14, the translation of four octets in the instruction CMC loads the second word of the register rwxmu9d0 into the register GPR1, all of whose bits are representative of a content of the stack x2y0d. In lines 15 through 20, the content of the six remaining words is loaded into the registers GPR2 through GRP7. It is then possible, using microcode, to process a slice of the stack x2y0d, namely that corresponding to the inputs e0 and e1.

Appendix 2 presents a simplified example of a sequence which allows the microprocessor to write a block of sixteen bytes into the main storage unit MMU, with a conversion of the data format. This read operation uses, as resources in the integrated circuit MEP 42, the registers rwxmu8d1 through rwxmu8d1__7 of the processor interface component 57. In the integrated circuit MEP 42, these registers are connected to the main storage unit MMU by means of the bus CPB and the port 55.

In lines 1 and 2, the zeroing of a cache memory line using an instruction RZLC (Data Cache Block Flush) allows the establishment of an image of the registers rwxmu8d1 through rwxmu8d1__3 and of the registers rwxmu8d1__4 through rwxmu8d1__7 in the cache memory. This image constitutes the image of the block to be written into the external memory unit.

Lines 4 through 19 execute the loading of the registers GPR0 through GPR 15 using an instruction RPC (Store Word), into the lines of the cache memory 94 which represent the registers rwxmu8d1 through rwxmu8d1__7 of the integrated circuit MEP. if the process is interrupted, or if there is a collision, the cache memory lines are backed up and restored when the process is reactivated.

In lines 21 and 22, an instruction VLC for flushing cache memory lines (Data Cache Block Flush) transfers, in burst mode, the block physically contained in the cache memory to the registers rwxmu8d1 through rwxmu8d1__7, that is, into the stack 91.

In line 24, the instruction CFD loads the address of the destination memory encodes in the bits labelled s and an address in the destination memory coded in the bits labelled a, into the double-precision floating-point register FPR0 of the microprocessor 43. For example, the bits labelled s set at zero indicate that the destination memory is the main storage unit MMU 9. In another example, the bits labelled s set at (0.1) or (1.0) indicate that the destination memory is the expanded storage unit EMU 8 or 12, respectively. In line 25, an instruction RFD stores, as a double-precision floating-point value, (Store Floating Double), that is, for example, in eight octets, the contents of the register FPR0 by direct access in the register wmmuh1__1, which physically is the register 92 of the processor interface component 57.

Lines 27 through 32 constitute a loop sequence of an active wait for an end-of-write in external storage, for example MMU. Line 27 is simply a label to which the wait sequence loops back. In line 28, the instruction CFD loads by direct access the content of the status register 93 named revstatm1 into the register FPR0. In line 29, the instruction RFD stores in the cache memory 94 the contents of the register FPR0, which is reloaded in line 30 into the register GPR0 by means of the instruction CMC. This makes it possible, in line 31, to perform a test on a value of the bit labelled rpr1. A null value of the bit rpr1 indicates that the transfer from the stack 91 to the external storage unit is not finished, and thus that it is necessary to repeat the sequence by branching to the label of line 27. A non-null value of the bit rpr1 indicates that the transfer to the external storage unit is finished or has been interrupted. In this case, the sequence branches to an analysis sequence which determines an end-of-write in the external storage unit uad1 or an error err1. This sequence makes it possible to start another write operation for increasing the transmission band or to have another activity while waiting to restart a write operation.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

APPENDIX 1

```
CFD FPR0 := 0x4000ss00aaaaaaaa
RFD cp_wmmhu0_1 := FPR0
loop
CFD FPR0 := cp_revstatm0
RFD cached data space := FPR0
CMC GPR0 := cached data space
test rpr0   if 0 goto loop
            if 1 goto read x2y0d
read x2y0d
VLC cp_ rwxmu9d0
CMC GPR0 := cp_ rwxmu9d0
CMC GPR1 := cp_rwxmu9d0 +4
CMC GPR2 := cp_rwxmu9d0_1
CMC GPR3 := cp_rwxmu9d0_1 +4
CMC GPR4 := cp_rwxmu9d0_2
CMC GPR5 := cp_rwxmu9d0_2 +4
CMC GPR6 := cp_rwxmu9d0_3
CMC GPR7 := cp_rwxmu9d0_3 +4
```

APPENDIX 2

```
RZLC cp_rwxmu8d1
RZLC cp_rwxmu8d1_4
RMC cp_rwxmu8d1            := GPR0
RMC cp_rwxmu8d1 +4         := GPR1
RMC cp_rwxmu8d1_1          := GPR2
RMC cp_rwxmu8d1_1 +4       := GPR3
RMC cp_rwxmu8d1_2          := GPR4
RMC cp_rwxmu8d1_2 +4       := GPR5
RMC cp_rwxmu8d1_3          := GPR6
RMC cp_rwxmu8d1_3 +4       := GPR7
RMC cp_rwxmu8d1_4          := GPR8
RMC cp_rwxmu8d1_4 +4       := GPR9
RMC cp_rwxmu8d1_5          := GPR10
RMC cp_rwxmu8d1_5 +4       := GPR11
RMC cp_rwxmu8d1_6          := GPR12
RMC cp_rwxmu8d1_6 +4       := GPR13
RMC cp_rwxmu8d1_7          := GPR14
RMC cp_rwxmu8d1_7 +4       := GPR15
VLC  cp_rwxmu8d1
```

APPENDIX 2-continued

```
VLC  cp_rwxmu8d1_4
CFD FPR0 := 0xC300ss00aaaaaaaa
RFD cp_wmmuh1_1 := FPR0
loop
CFD FPR0 := cp_revstatm1
RFD cached data space := FPR0
CMC GPR0 := cached data space
test rpr1  if 0 goto loop
           if 1 go to analyze error report (err1, uad1)
```

We claim:

1. An electrical circuit (5, 7, 41) comprising:
   a memory unit (8, 9, 12),
   a microprocessor (43) for exchanging data with the memory unit (8, 9, 12), said memory unit being disposed external to a memory space of the microprocessor, said microprocessor comprising a cache memory (94), and an integrated circuit (42) serving as an interface between the microprocessor (43) and the memory unit (8, 9, 12),
   the integrated circuit (42) comprising:
   a stack (91) adapted to contain a data block of the memory unit (8, 9, 12) such that the block from the memory unit (8, 9, 12) is seen as one or more blocks in the cache memory (94), and
   a register (92) belonging to the memory space of the microprocessor (43), and adapted to contain addresses for access to the memory unit (8, 9, 12).

2. The electrical circuit (5, 7, 41) according to claim 1, characterized in that addressing of the stack (91) in the memory space of the microprocessor encodes a physical block address and a mode for reading or writing said block in the stack (91).

3. The electrical circuit (5, 7, 41) according to claim 1, characterized in that addressing of the register (93) in the memory space of the microprocessor encodes its physical address and an input of a port (51, 54, 55) from the integrated circuit (42) to a storage unit (8, 9, 12).

4. The electrical circuit (5, 7, 41) according to claim 1, characterized in that said circuit is adapted to pass through data coded in nine bits to data encoded in eight bits.

5. A computer comprising an electrical circuit including a microprocessor (43) for exchanging data with a memory unit (8, 9, 12) external to a memory space of the microprocessor, said microprocessor comprising a cache memory (94), and an integrated circuit (42) serving as an interface between the microprocessor (43) and the memory unit (8, 9, 12), the integrated circuit (42) comprising:
   a stack (91) adapted to contain a data block of the memory unit (8, 9, 12) such that the block from the memory unit (8, 9, 12) is seen as one or more blocks in the cache memory (94), and
   a register (92) belonging to the memory space of the microprocessor (43), adapted to contain addresses for access to the memory unit (8, 9, 12).

6. A computer according to claim 5, characterized in that addressing of the stack (91) in the memory space of the microprocessor encodes a physical block address and a mode for reading or writing said block in the stack (91).

7. A computer according to claim 5, characterized in that addressing of the register (93) in the memory space of the microprocessor encodes its physical address and an input of a port (51, 54, 55) from the integrated circuit (42) to a storage unit (8, 9, 12).

8. A computer according to claim 5, characterized in that said circuit is adapted to pass through data encoded in nine bits to data coded in eight bits.

9. A process for obtaining in a cache memory (94) of a microprocessor (43) an image of a data block to be read or written in a memory space (8, 9, 12) external to that of the microprocessor (43), characterized in that said process comprises a step for loading said block in bursts from registers (91) having a first label (rwxmu9d) for reading said block and for storing said block in bursts in the same registers (91) having a second label (rwxmu8d) for writing said block.

10. The process according to claim 9, characterized in that the first label (rwxmu9d) the register (91) encodes its loading into the microprocessor (43) in bytes compatible with a data path width accessible to registers (GPR0, GPR7) of the microprocessor (43).

11. The process according to claim 9, characterized in that the second label (rwxmu8d) the register (91) encodes its storage beginning with registers (GPR0, GPR15) of the microprocessor (43) in bytes compatible with a number of bits possessed by a set of bytes from the external memory space.

* * * * *